US012566281B2

(12) United States Patent
Lee et al.

(10) Patent No.: US 12,566,281 B2
(45) Date of Patent: Mar. 3, 2026

(54) MICROLENS ARRAY FOR ACQUIRING MULTI-FOCUS PLENOPTIC IMAGE AND METHOD OF MANUFACTURING THE SAME

(71) Applicant: ELECTRONICS AND TELECOMMUNICATIONS RESEARCH INSTITUTE, Daejeon (KR)

(72) Inventors: Mun Seob Lee, Daejeon (KR); Sang Yun Kim, Daejeon (KR); Chihoon Kim, Daejeon (KR); Ji Won Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 337 days.

(21) Appl. No.: 18/342,625

(22) Filed: Jun. 27, 2023

(65) Prior Publication Data

US 2024/0053516 A1     Feb. 15, 2024

(30) Foreign Application Priority Data

Aug. 11, 2022    (KR) ........................ 10-2022-0100651
Nov. 15, 2022    (KR) ........................ 10-2022-0152344

(51) Int. Cl.
*G02B 3/00*        (2006.01)
*H04N 23/957*      (2023.01)

(52) U.S. Cl.
CPC ......... *G02B 3/0068* (2013.01); *G02B 3/0031* (2013.01); *G02B 3/0056* (2013.01); *H04N 23/957* (2023.01)

(58) Field of Classification Search
None
See application file for complete search history.

(56) References Cited

U.S. PATENT DOCUMENTS 6,473,238 B1 * 10/2002 Daniell ................ H04N 13/307
                                        348/E13.043
8,619,177 B2    12/2013 Perwass et al.
                (Continued)

FOREIGN PATENT DOCUMENTS

JP        H05-509416 A      12/1993
KR        10-1605392 B1      3/2016
KR      10-2021-0151474 A    12/2021

OTHER PUBLICATIONS

Sang-In Bae et al., "Multifocal microlens arrays using multilayer photolithography," Optics Express, Mar. 30, 2020, vol. 28, No. 7.

*Primary Examiner* — Robert E. Tallman

(57) ABSTRACT

The present disclosure can effectively improve an angular image resolution and a spatial image resolution compared to the related art by solving a problem of a plenoptic image based on a microlens array according to the related art. In the case of the microlens array according to the related art, microlenses having different numerical apertures (NAs) and F # (F numbers) or focal lengths are positioned on one substrate. However, in the present disclosure, two or more microlens arrays having different NAs and F # are stacked in a layer form (all the microlenses of each microlens array are formed in the same F # and the same NA) to allow various F # and various NAs to be implemented, and thus an image of an object is formed on a sensor plane at different positions. Accordingly, a spatial resolution and a depth resolution increase.

20 Claims, 7 Drawing Sheets

(56)                    References Cited

U.S. PATENT DOCUMENTS 10,091,485  B2    10/2018  Lim
    10,127,646  B2    11/2018  Oh et al.
  2006/0092158  A1*   5/2006  Shestak ................. G02B 30/56
                                                      345/424
  2008/0013182  A1*   1/2008  Ferber ............... B23K 26/0648
                                                      359/619
  2008/0290383  A1*  11/2008  Dunne ............... H10F 39/8063
                                                      257/292
  2010/0033829  A1*   2/2010  Wippermann ........ G02B 27/01
                                                      359/623
  2012/0033079  A1    2/2012  Karl
  2021/0250481  A1*   8/2021  Takashima ........ G02B 19/0085

* cited by examiner

FIG. 4A
NA1=0.02
f1
NA1=0.039
f2
NA3=0.054
f3
FIG. 4B
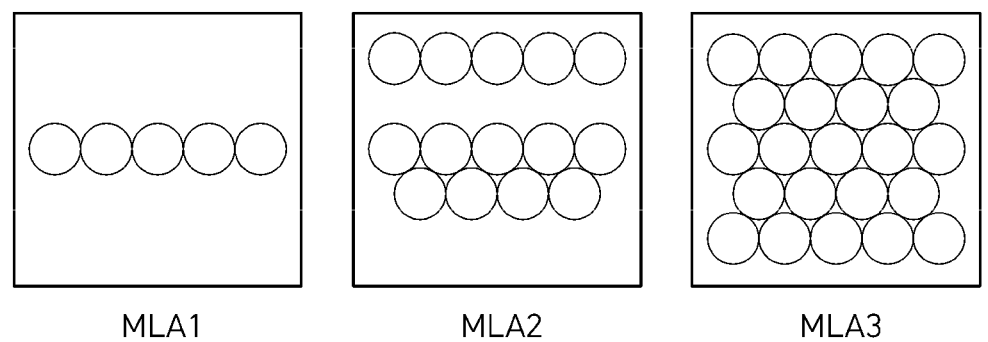
MLA1            MLA2            MLA3
FIG. 4C
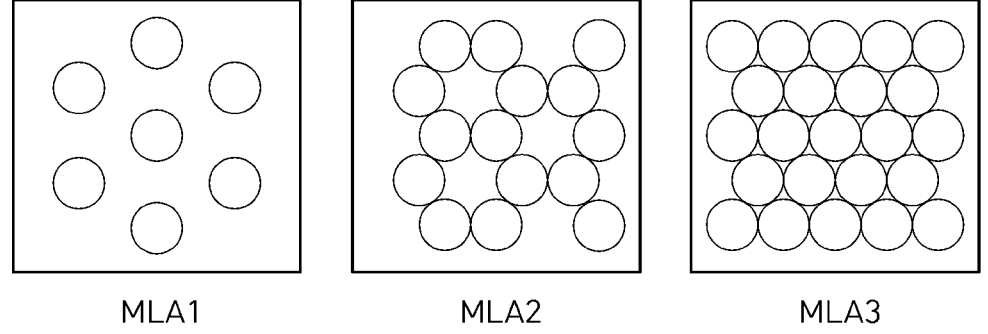
MLA1            MLA2            MLA3

FIG. 5A
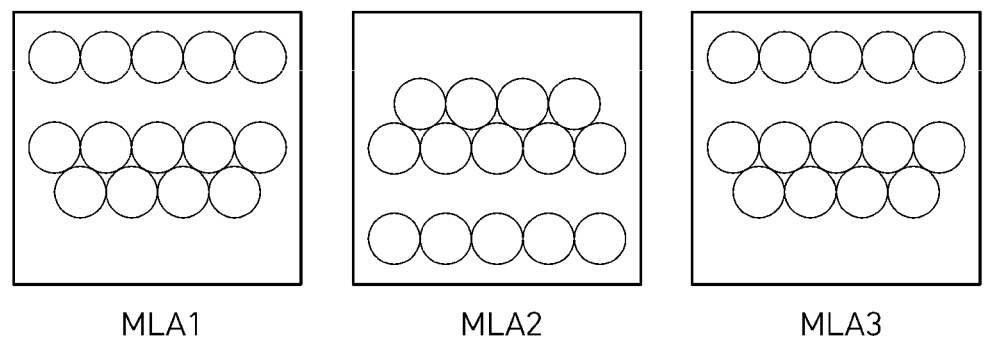
FIG. 5B
MLA1         MLA2         MLA3
FIG. 5C
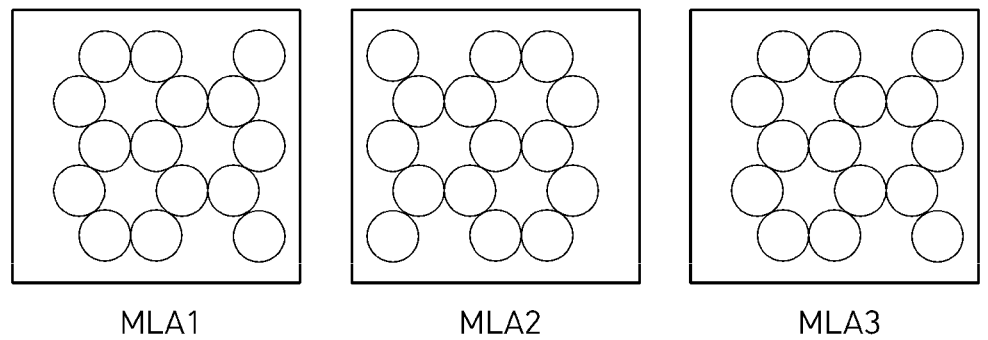
MLA1         MLA2         MLA3

MICROLENS ARRAY FOR ACQUIRING MULTI-FOCUS PLENOPTIC IMAGE AND METHOD OF MANUFACTURING THE SAME

CROSS-REFERENCE TO RELATED APPLICATION

This application claims priority to and the benefit of Korean Patent Application No. 10-2022-0100651, filed on Aug. 11, 2022 and Korean Patent Application No. 10-2022-0152344, filed on Nov. 15, 2022, the disclosures of which are incorporated herein by reference in their entirety.

BACKGROUND

1. Field of the Invention

The present disclosure relates to a plenoptic technology, and more particularly, to a microlens array for acquiring a plenoptic image having a configuration which can effectively acquire both the position information of a space region and the direction information of each region, and a method of manufacturing the same.

2. Discussion of Related Art

A plenoptic or light-field imaging technology is a technology for obtaining four-dimension (x, y, $\theta$, $\varphi$) light field information of light emitted from an object or scene. In the plenoptic technology, light emitted from an object is recorded through an array of cameras or lenses having different focal points or positions and a single image sensor. That is, a three-dimensional image of the object may be acquired by recording images having different directions emitted from the object, and therefore, an image corresponding to a certain viewpoint or focal point may be restored.

A plenoptic camera prototype system proposed by Ng, Adelson, et. al. of Stanford University in 2005 is represented as a plenoptic camera that acquires images from different viewpoints by placing a microlens array (MLA) element in a single sensor.

FIG. 1A illustrates a plenoptic camera system based on Plenoptic 1.0 proposed by them. For actual implementation of the system, based on a general digital camera, an MLA 10 is positioned in front of an imaging sensor 20, and intensity information on lights passing through a camera's main lens 30 among lights emitted from one point of an object 40 in various directions are separately recorded according to each direction. They implemented a plenoptic system in which the MLA element 10 is placed at a focal length f1 of the main lens 30, light from the object in an angular direction impinges to the imaging sensor 20, and thus angle information of the object is acquired. However, in this method, spatial resolution of an image 50 is degraded due to noise generated because the light emitted from the object 40 is incident to all surfaces of the MLA 10, and the spatial resolution of a restored image is further degraded in a process of generating a sub-aperture image that is an intermediate process of collecting pixels of the MLA 10 according to each position for restoration.

A method for compensating for the above Plenoptic 1.0 is a method called Plenoptic 2.0. This is a method, as illustrated in FIG. 1B, of obtaining spatial information on an image plane of the object by positioning the MLA 10 on the image plane of the main lens 30. Since images at different positions of the main lens are each formed on a corresponding one of MLAs, images formed on the respective microlens constituting the MLA 10 become sub-aperture images, and thus spatial resolution of the image 50 is improved. However, on the other hand, depth resolution is lowered, and a depth of field (DoF) is shortened.

In recent years, Multi-focus plenoptic technology as illustrated in FIG. 1C has been proposed. This is a technology for increasing the DoF and increasing the depth resolution by placing an MLA 10' in which microlenses having different focal distances are arranged on the image plane of the main lens 30. However, in this case, since the MLA 10' in which microlenses having different focal distances are arranged should be manufactured, process difficulty becomes high and a yield rate low (Raytrix's multi-focus camera is about US$75,000 or more, compared to that of Lytro's plenoptic 1.0 camera is about US$452). In particular, the aberration or the refractive surface distortion of a microlens lowers the resolution of the image 50, and makes it difficult to restore each image 50.

SUMMARY OF THE INVENTION

The present disclosure solves the problems of a plenoptic image based on a microlens array according to the related art and is directed to providing a microlens array for acquiring a plenoptic image which can effectively improve an angular image resolution and a spatial image resolution as compared to the related art, a method of manufacturing the same, and an apparatus for acquiring an image to which the same is applied.

In the case of a microlens array according to the related art, microlenses having different numerical apertures (NAs) and F # (F numbers) or focal lengths are positioned on one substrate. However, in the present disclosure, two or more microlens arrays having different NAs and F # are stacked in a layer form (all the microlenses of each microlens array are formed in the same F # and the same NA), various F # and various NAs are implemented, and thus an image of an object is formed on a sensor plane at different positions. Accordingly, a spatial resolution and a depth resolution increase.

According to an aspect of the present disclosure, there is provided a microlens array for acquiring a multi-focus plenoptic image, the microlens array including a first individual microlens array in which a first microlens having a first focal length is arranged, and a second individual microlens array in which a second microlens having a second focal length is arranged, wherein the first individual microlens array and the second individual microlens array overlap each other to form a plurality of different focal lengths.

The microlens array may further include an $n^{th}$ (n is a natural number of 3 or more) individual microlens array which overlaps the first individual microlens array and the second individual microlens array and in which an $n^{th}$ individual microlens having an $n^{th}$ focal length is arranged. The first individual microlens array, the second individual microlens array, and a third individual microlens array may overlap each other or more individual microlens arrays may overlap each other.

According to another aspect of the present disclosure, there is provided a method of manufacturing a microlens array for acquiring a multi-focus plenoptic image, the method including forming a first microlens having a first focal length on a substrate to manufacture a first individual microlens array, forming a second microlens having a second focal length on the substrate to manufacture a second individual microlens array, and allowing the first individual microlens array and the second individual microlens array to overlap each other.

According to yet another aspect of the present disclosure, there is provided an apparatus for acquiring a multi-focus plenoptic image, for example, a multi-focus plenoptic camera, a multi-focus plenoptic microscope, and the like, the apparatus including a main lens configured to focus a light from an object, an image sensor configured to image the light focused by the main lens, and a microlens array including a first individual microlens array which is positioned between the main lens and the image sensor and in which a first microlens having a first focal length is arranged; and a second individual microlens array which overlaps the first individual microlens array and in which a second microlens having a second focal length is arranged, wherein the microlens array transfers the light focused by the main lens to the image sensor at a plurality of focal lengths.

Detailed configurations and operations of the present disclosure will become clearer through detailed embodiments described below with reference to the drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 4A is a cross-sectional view illustrating the overlapped MLA according to an embodiment of the present disclosure;

FIGS. 4B and 4C are an arrangement example of microlenses of individual MLAs constituting the overlapped MLA of FIG. 4A;

FIG. 5A is a cross-sectional view illustrating an overlapped MLA according to another embodiment of the present disclosure;

FIGS. 5B and 5C are an arrangement example of microlenses of individual MLAs constituting the overlapped MLA of FIG. 5A;

4

DETAILED DESCRIPTION OF EXEMPLARY EMBODIMENTS

Hereinafter, embodiments of the present disclosure will be described in detail with reference to the accompanying drawings. Terms used in the following description are intended to describe the embodiments of the present disclosure and are not intended to limit the present disclosure. In the present specification, a singular form also includes a plural form unless specifically mentioned. The term "comprise" or "comprising" used herein does not exclude the presence or addition of one or more other components, steps, operations, and/or elements in addition to components, steps, operations, and/or elements described above.

Figure 2:
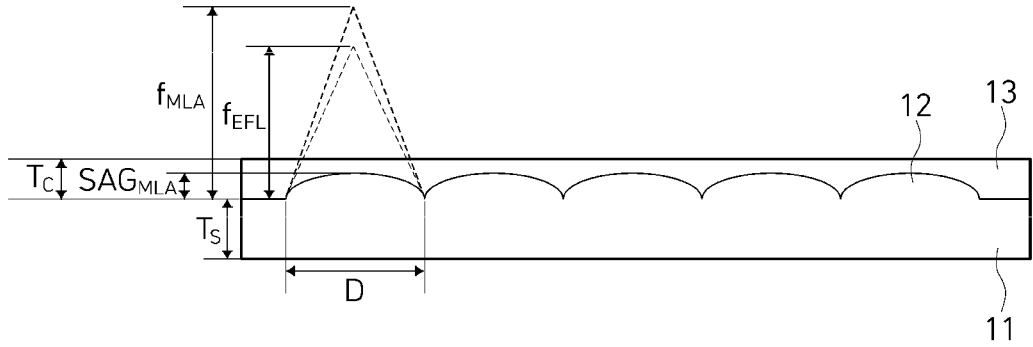
FIG. 2 is a schematic cross-sectional view for describing a general MLA.

FIG. 2 introduces a configuration of a general microlens array (MLA).

The MLA has a form in which a plurality of microlenses 12 are arranged on a substrate 11. The MLA may be manufactured by various methods such as lithography, photolithography, ultraviolet (UV) lithography, laser direct lithography, overcast, molding replication, imprinting, etc., and may be manufactured of various materials such as silica or polymer. Various forms such as a hexagonal arrangement for maximally reflecting a fill-factor (arrangement in which a shape connecting centers of the microlenses has a honeycomb structure) and a rectangular arrangement (arrangement in a lattice structure so that the shape connecting the centers of the microlenses has a quadrangular shape) may be applied as the arrangement of the microlenses 12. Depending on the design, after the microlens 12 is arranged on the substrate 11, a coating surface 13 may be formed of a material different from a refractive index of a microlens material to adjust a focal length thereof. The coating surface 13 may be used for changing the refractive index but also may be not used.

In FIG. 2, $f_{MLA}$ denotes a focal distance of the MLA, D denotes a diameter of each microlens, $f_{EFL}$ denotes an effective focal length when the coating surface 13 is applied, $T_S$ denotes a height (a thickness) of a substrate, $SAG_{MLA}$ denotes a height of the microlens from a substrate surface, and $T_C$ denotes a thickness of the coating surface.

A numerical aperture NA of the MLA is generally provided as following equations.

$$NA_{mla} = n_{mla}\sin\theta \cong n_{mla}\frac{D_{mla}}{f_{efl}}$$

$$SAG_{mla} = f_{mla} - \sqrt{f_{mla}^2 - \left(\frac{D_{mla}^2}{2}\right)}$$

Here, $n_{mla}$ denotes a refractive index of the MLA, and $D_{mla}$ denotes a diameter of an individual microlens.

Thus, the NA of the MLA can be calculated by designing the refractive index, the height, the diameter, and the like of each microlens 12. In general, since the NA through a main lens and a tube lens of an ×10 magnification microscope is 0.025, a horizontal resolution and a depth resolution can be optimally designed by matching the diameter, the refractive index, and an SAG of the MLA.

Figure 1A:
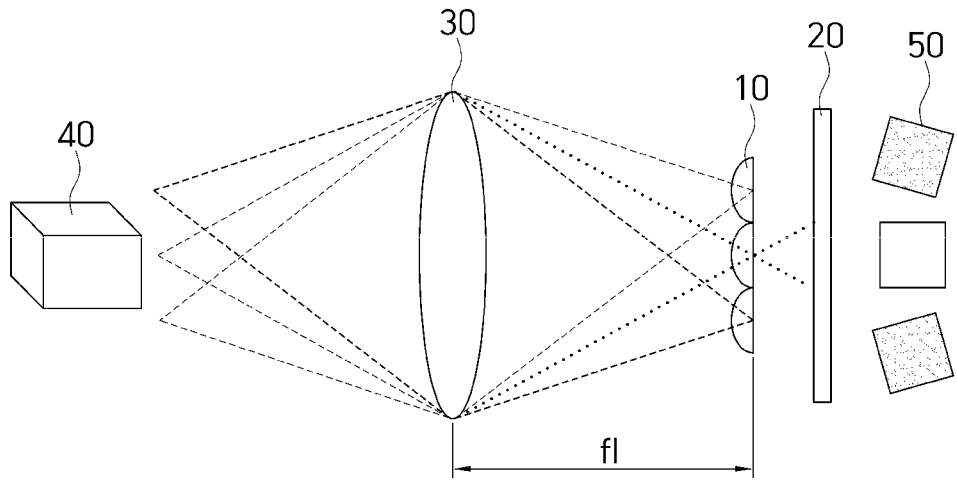
FIG. 1A is a schematic view illustrating a plenoptic 1.0 camera.
Figure 1B:
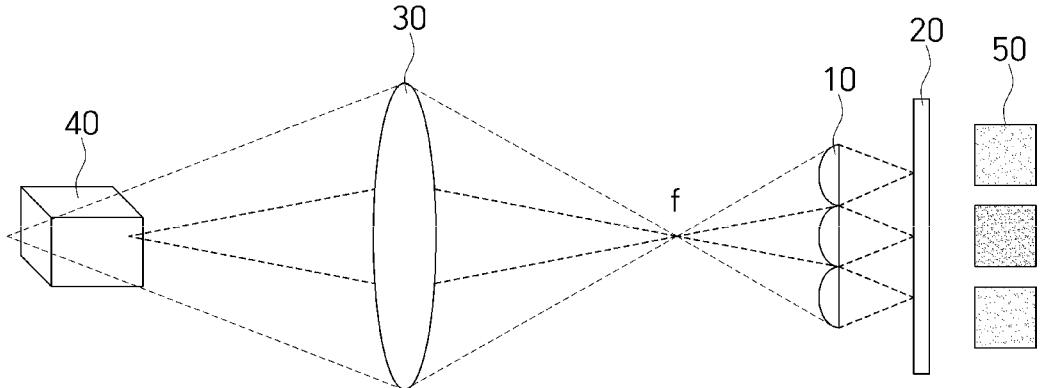
FIG. 1B is a schematic view illustrating a plenoptic 2.0 camera.
Figure 1C:
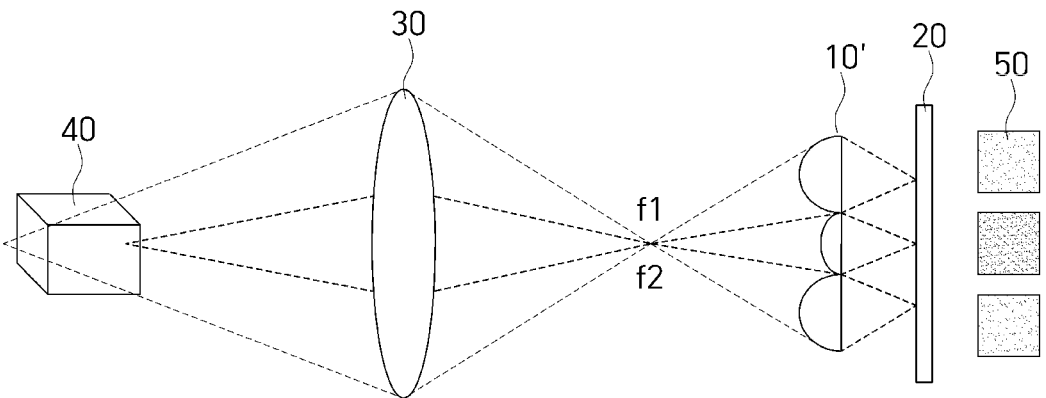
FIG. 1C is a schematic view illustrating a multi-focus plenoptic camera (to which a multi-focus microlens array (MLA) is applied)

The MLA designed as above is applied to Plenoptics 1.0 or 2.0 to obtain a plenoptic image as described above. Meanwhile, a multi-focus MLA (FIG. 1C) is implemented by changing the SAG or diameter D so that focal lengths of the respective microlenses are different. In this case, manufacturing processes are difficult due to different SAGs or different diameters, and a yield rate is lowered due to large errors, as described above.

Figure 3A:
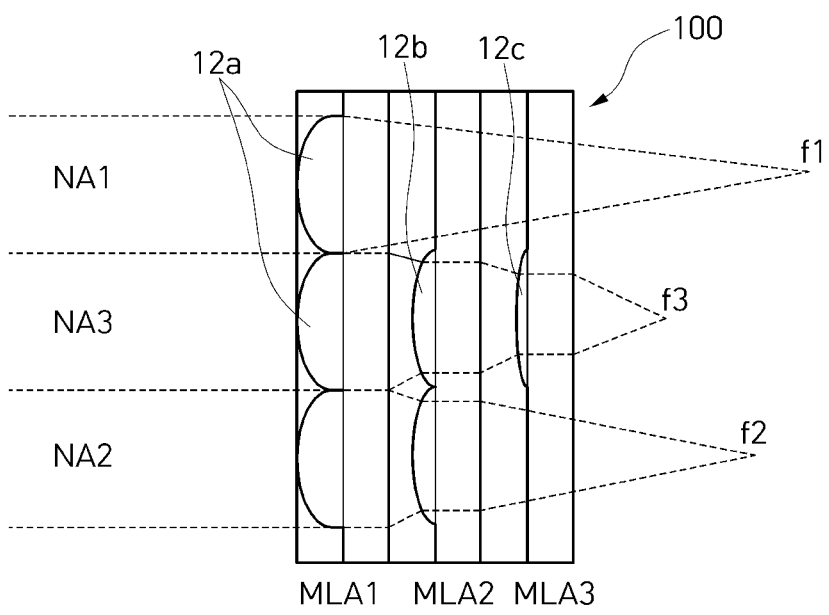
FIG. 3A is a cross-sectional view illustrating an overlapped MLA for description of a concept of the present disclosure.
Figure 3B:
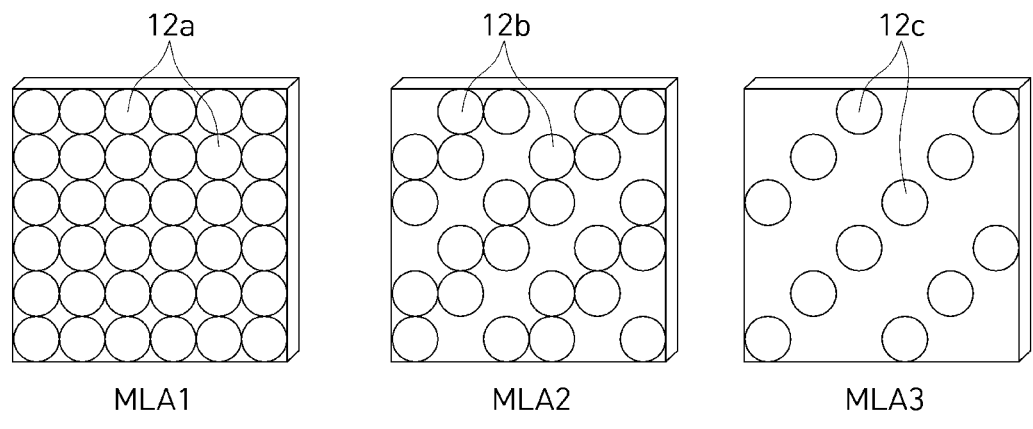
FIG. 3B illustrates an arrangement example of the MLA illustrated in FIG. 3A.

Reference is made to FIGS. 3A and 3B for description of the principle of the "overlapped MLA" according to the present disclosure. The overlapped MLA illustrated in FIGS. 3A and 3B illustrates an MLA 100 implemented to obtain three different F # or focal lengths as MLA1, MLA2, and MLA3 having different NAs, F #, and focal lengths overlap each other. However, according to the principle of the present disclosure, the overlapped MLA that obtains two, three or more focal lengths may be manufactured.

In FIG. 3A, in order to implement the overlapped MLA 100 that may obtain three different focal lengths f1, f2, and f3, the individual MLAs (MLA1, MLA2, and MLA3) having specific NAs and focal points are stacked (i.e., over-lapped). The NAs and focal points of the individual MLAs, MLA1, MLA2, and MLA3, are different from each other. (However, the NAs and the focal points of the microlenses constituting each individual MLA are the same.)

The first individual MLA, MLA1, has the longest focal length f1 and the lowest NA1, and microlenses 12*a* are arranged in a close lattice (i.e., quadrangular) shape (see FIG. 3B). A coating surface of the first individual MLA, MLA1, may be applied or not applied according to the focal length.

A second individual MLA, MLA2, overlaps the first individual MLA, MLA1, and thus microlenses 12*b* are arranged at positions in which a focal length f2 may be made shorter than the focal length f1 of the MLA1. In order to change the focal length of the MLA1 to f2, a medium refractive index, a diameter, a height (i.e., SAG), a concave/convex shape, and a refractive index of a coating medium of the microlenses 12*b* of the MLA2 may be changed.

A third individual MLA, MLA3, overlaps the MLA1 and the MLA2, and thus microlenses 12*c* are arranged at positions in which a focal length f3 may be made shorter than the focal length f2 due to the overlapping between the MLA1 and the MLA2. The change to the focal length f3 may be achieved by changing a medium refractive index, a diameter, a height (i.e., SAG), a concave/convex shape, and a refractive index of a coating medium of the microlenses 12*c*.

In this way, as the second and third individual MLAs, MLA2 and MLA3, in which the microlenses are arranged in different positions in different quantities, overlap the first individual MLA, MLA1, a plurality of (here, three) NAs and a plurality of (here, three) focal lengths may be made. That is, the focal length f1 of the overlapped MLA is obtained by the MLA1 in which the microlens having the numerical aperture NA1 is disposed, the focal length f of the over-lapped MLA is obtained by overlapping between the MLA1 and the MLA2 in which the microlens having the numerical aperture NA2 is disposed, and the focal length f3 of the overlapped MLA is obtained by overlapping between the MLA1, the MLA2, and the MLA3 in which the microlens having the numerical aperture NA3 is disposed.

FIG. 3B illustrates an arrangement of the microlenses 12*a*, 12*b*, and 12*c* of the first individual MLA, MLA1, the second individual MLA, MLA2, and the third individual MLA, MLA3. FIG. 3B illustrates that the individual MLAs are configured in a rectangular lattice structure in which microlenses are densely formed vertically and horizontally (a shape connecting the centers of the microlenses is a quadrangular), and however, according to an embodiment, the individual MLAs may be arranged in a honeycomb structure or other polygonal structures.

In an example of FIG. 3B, in the MLA1 the microlenses 12*a* are arranged in a dense lattice structure so that all the microlenses 12*a* make the focal length f1, and in the MLA2 the number of microlenses 12*b* is partially reduced, the microlenses 12*b* are arranged only at predetermined positions, and thus the microlenses 12*b* overlap the microlenses 12*a* of the MLA1 only at this position to make the focal length f2. Further, in the MLA3 the number of microlenses 12*c* is further reduced, and the microlenses 12*c* are arranged at other predetermined positions, and thus the microlenses 12*c* overlap the microlenses 12*a* of the MLA1 and the microlenses 12*b* of the MLA2 only at the predetermined position to make the focal length f3.

A description will be made in more detail. For simplicity of discussion, it is assumed that all the individual MLAs, MLA1 to 3 have the same refractive index of 1.43. Further, it is assumed that the refractive index of the coating surface between the respective MLAs is 1.0 that is the same as the refractive index of the air. Further, it is assumed that all the microlenses have the same diameter D. In this case, when NA1=0.015, NA2=0.025, and NA3=0.065 in the input light source, the NAs and the focal lengths of the individual MLAs are provided as follows.

$$NA_i = n_i \sin\theta \cong n_i \frac{D_{mla}}{f_i}$$

In the above equation, it may be seen that $NA_1$ may be determined by $f_1$, and when it is assumed that D is 160 μm and NA of the main lens is 0.015, f is 7,600 μm. In this case, the SAG (height) of the microlens has about 1.2 μm according to the above equation, and a radius of curvature (RoC) of the microlens has 2650 μm. However, in this case, it is simply assumed that the individual MLA is alone, and in reality, since a structure in which the MLA2 and the MLA3 overlap should be considered, when it is assumed that a thickness T of the respective MLAs is 3,000 μm, the focal length is about 4,000 μm according to the following equation.

$$f_{bfl} = \frac{RoC}{n-1} - \frac{T}{n}$$

($f_{bfl}$ denotes a back focal length, and n is a refractive index)

When it is assumed that NA=0.025 to determine $f_2$, $f_2$ is about 2320 μm. Finally, when it is assumed that NA=0.065, $f_3$ is about 750 μm.

As above, the focal length may be determined sequentially according to the input NA, and in this case, the SAG heights of the respective MLAs can be calculated through an optical simulation tool or formula.

FIG. 4A is a partial cross-sectional view illustrating the overlapped MLA according to an embodiment of the present disclosure. The individual MLAs, MLA1, MLA2, and MLA3, having microlenses having different arrangements overlap each other. Referring to the cross-sectional view illustrated in FIG. 4A, the MLA1 has microlenses at a lower portion thereof, the MLA2 has microlenses in a central portion and a lower portion thereof, and the MLA3 has the microlenses at an upper portion, a central portion, and a lower portion thereof. Thus, all the individual MLAs should be manufactured with different molds.

FIG. 4B is an example of an arrangement of the microlenses of the individual MLAs, MLA1, MLA2, and MLA3, and FIG. 4C is an example of another arrangement thereof.

FIG. 5A is a partial cross-sectional view illustrating the overlapped MLA according to another embodiment of the present disclosure. FIG. 5B is an example of an arrangement of the microlenses of the individual MLAs, MLA1, MLA2, and MLA3, and FIG. 5C is an example of another arrangement thereof. In both cases, it may be seen that the microlenses of the individual MLAs have the same arrangement.

The individual MLAs, MLA1, MLA2, and MLA3, having microlenses having the same arrangement overlap each other. All the individual MLAs herein have the same MLA form as illustrated in FIG. 5B or FIG. 5C. The individual MLAs may be rotated in an up-down direction or left-right direction or overlap each other in the same direction to make the overlapped MLA as illustrated in FIG. 5A. In an embodiment, the individual MLAs are the same and thus can be manufactured with one mold.

Figure 6A:
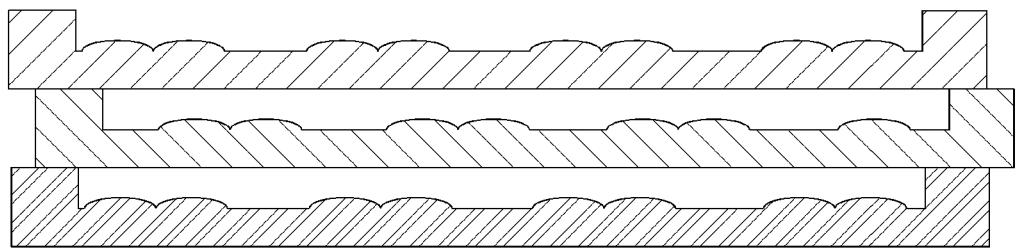
FIG. 6A illustrates an example of the overlapped MLA when the microlens is implemented as a convex lens.
Figure 6B:
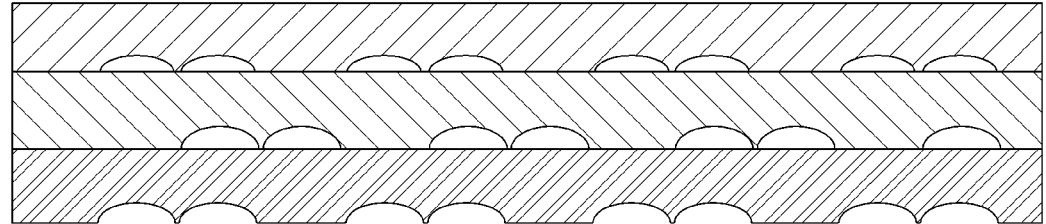
FIG. 6B illustrates an example of the overlapped MLA when the microlens is implemented as a concave lens.

Each microlens of the individual MLAs may be formed as a convex lens or a concave lens. FIG. 6A illustrates that the individual MLAs in which the microlenses are convex lenses overlap, and FIG. 6B illustrates that the individual MLAs in which the microlenses are concave lenses overlap.

Figure 7:
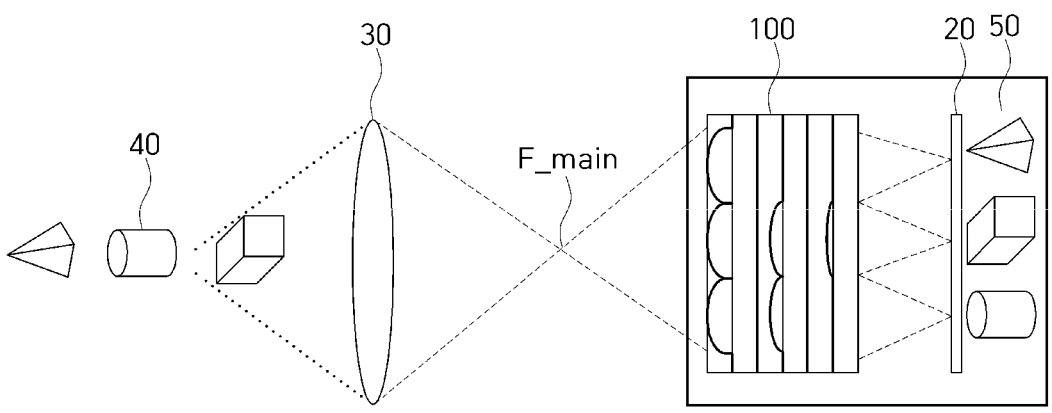
FIG. 7 is a schematic diagram illustrating a plenoptic camera to which the MLA according to the present disclosure is applied.

FIG. 7 is a picture illustrating that a stacked MLA (an overlapped MLA) according to the present disclosure is applied to a plenoptic camera.

In FIG. 7, the main lens may be replaced by an objective lens and a tube lens in the case of a microscope; and may be replaced by an objective lens, a camera lens, or a telephoto lens in the case of a general camera. When the NA of the main lens has a value of approximately 0.15 to 0.065, the previously designed parameters may be applied, and the actual design specifications of the stacked MLA may be changed according to the NA of the main lens.

Figure 8:
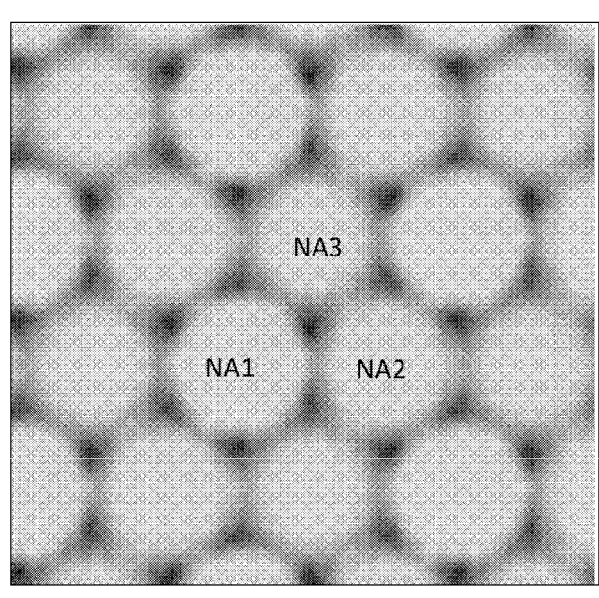
FIG. 8 is an image of a multi-focus MLA to which the overlapped MLA is applied.

An image form of the multi-focus MLA to which the overlapped MLA according to the present disclosure is applied is obtained as in FIG. 8. This image illustrates a case in which the NA of the main lens coincides with the NA1. In the case of rough images of NA2 and NA3, a blur phenomenon is observed, but this is a characteristic of a multi-focus plenoptic image. In the case of the multi-focus plenoptic image, as positions on which an object is focused are different from each other according to NA1, NA2, NA3, and the like, an improved depth of field (DoF) as compared to an image of a Plenoptic 2.0 camera having the existing NA1 is achieved. Blurring at the NA2 and NA3 may be recovered through a general plenoptic image processing algorithm.

According to the present disclosure, a plenoptic camera based on a microlens array which can effectively improve an angular image resolution and a spatial image resolution as compared to the related art can be implemented. Thus, simplicity and convenience of a manufacturing process, improved accuracy of the microlens array, and an improved resolution of a plenoptic image as compared to the related art can be achieved.

A plenoptic microscope that can be applied to machine vision and medical fields can be implemented utilizing the present disclosure. Further, the manufacturing process becomes simpler as compared to the related art, the existing microlens array may be used, and thus the economic feasibility and yield rate can be improved.

Hereinabove, an embodiment in which the spirit of the present disclosure is implemented in detail has been described. However, the technical scope of the present disclosure is not limited to the embodiments and drawings describe above, but is determined by reasonable interpretation of the appended claims.

What is claimed is:

1. A microlens array for acquiring a multi-focus plenoptic image, the microlens array comprising:
   a first individual microlens array in which a plurality of first microlenses are arranged; and
   a second individual microlens array in which a plurality of second microlenses are arranged,
   wherein the first individual microlens array and the second individual microlens arrays are stacked to form the microlens array, a first portion of the microlens array includes a first one of the first microlenses without overlapping any of the second microlenses so as to form a first focal length with a first focal point, and a second portion of the microlens array includes a second one of the first microlenses overlapping a corresponding one of the second microlenses so as to form a second focal length with a second focal point, each of the first and second focal points lying outside the first and second individual microlens arrays.

2. The microlens array of claim 1, further comprising:
   a third individual microlens array in which a plurality of third microlenses are arranged.

3. The microlens array of claim 1, wherein the second focal length is different from the first focal length.

4. The microlens array of claim 1, wherein the second focal length is shorter than the first focal length.

5. The microlens array of claim 1, wherein an arrangement of the second microlenses of the second individual microlens array is different from an arrangement of the first microlenses of the first individual microlens array.

6. The microlens array of claim 1, wherein an arrangement of the second microlenses of the second individual microlens array is the same as an arrangement of the first microlenses of the first individual microlens array.

7. The microlens array of claim 1, wherein at least one of the first individual microlens array and the second individual microlens array includes a coating surface.

8. A method of manufacturing a microlens array for acquiring a multi-focus plenoptic image, the method comprising:
   forming a plurality of first microlenses on a substrate to manufacture a first individual microlens array;
   forming a plurality of second microlenses on the substrate to manufacture a second individual microlens array; and
   stacking the first individual microlens array and the second individual microlens array to form the microlens array, wherein a first portion of the microlens array includes a first one of the first microlenses without overlapping any of the second microlenses so as to form a first focal length with a first focal point, and a second portion of the microlens array includes a second one of the first microlenses overlapping a corresponding one of the second microlenses so as to form a second focal length with a second focal point, each of the first and second focal points lying outside the first and second individual microlens arrays.

9. The method of claim 8, further comprising:
   forming a plurality of third microlenses on the substrate to manufacture a third individual microlens array; and
   stacking the third individual microlens array to overlap the first individual microlens array and the second individual microlens array to form the microlens array.

10. The method of claim 8, wherein the second focal length is different from the first focal length.

11. The method of claim 8, wherein the second focal length is shorter than the first focal length.

12. The method of claim 8, wherein an arrangement of the second microlenses formed in the second individual microlens array is different from an arrangement of the first microlenses formed in the first individual microlens array.

13. The method of claim 8, wherein an arrangement of the second microlenses formed in the second individual microlens array is the same as an arrangement of the first microlenses formed in the first individual microlens array.

14. The method of claim 8, further comprising:
forming a coating surface in the first individual microlens array.

15. The method of claim 8, further comprising:
forming a coating surface in the second individual microlens array.

16. An apparatus for acquiring a multi-focus plenoptic image, the apparatus comprising:
a main lens configured to focus a light from an object;
an image sensor configured to image the light focused by the main lens; and
a microlens array including a first individual microlens array which is positioned between the main lens and the image sensor and in which a plurality of first microlenses are arranged, and a second individual microlens array which overlaps the first individual microlens array and in which a plurality of second microlenses are arranged, wherein the microlens array transfers the light focused by the main lens to the image sensor at a plurality of focal lengths,

wherein the first individual microlens array and the second individual microlens arrays are stacked to form the microlens array, a first portion of the microlens array includes a first one of the first microlenses without overlapping any of the second microlenses so as to form a first focal length with a first focal point, and a second portion of the microlens array includes a second one of the first microlenses overlapping a corresponding one of the second microlenses so as to form a second focal length with a second focal point, each of the first and second focal points lying outside the first and second individual microlens arrays.

17. The apparatus of claim 16, wherein the microlens array further includes:
a third individual microlens array in which a plurality of third microlenses are arranged.

18. The microlens array of claim 2, wherein a third portion of the microlens array includes a third one of the first microlenses overlapping a corresponding one of the second microlenses and a corresponding one of the third microlenses so as to form a third focal length with a third focal point, the third focal point lying outside the first, second, and third individual microlens arrays.

19. The microlens array of claim 18, wherein the second focal length is shorter than the first focal length, and the third focal length is shorter than the second focal length.

20. The microlens array of claim 6, wherein the second individual microlens array is disposed with an orientation rotated by 180 degrees relative to an orientation of the first individual microlens array about an axis along which the first and second individual microlens arrays are stacked.

* * * * *